United States Patent Office 3,404,161
Patented Oct. 1, 1968

3,404,161
ARYL HETERO CYANOACRYLATES
Albert F. Strobel, Delmar, and Sigmund C. Catino, Castleton, N.Y., assignors to GAF Corporation, a corporation of Delaware
No Drawing. Continuation-in-part of application Ser. No. 247,815, Dec. 28, 1962. This application Dec. 20, 1966, Ser. No. 603,126
16 Claims. (Cl. 260—332.2)

ABSTRACT OF THE DISCLOSURE

Substantially colorless compounds which exhibit a prominent absorption peak between 2500 A. and 4000 A. and which are outstanding absorbents for ultra-violet radiation and excellent stabilizers for organic materials to protect them against the degradative effects of such radiation, are characterized as α-cyano β-aryl, β-monocyclic heterocyclic acrylates, said heterocycles being of the group containing 5 and 6 members in the ring and wherein the hetero atom is at least one of the group of oxygen, nitrogen and sulfur, and also including dimer forms of such compounds linked with a bivalent bridging radical such as alkylene, phenylene, etc.

---

This application is a continuation in part of application Ser. No. 247,815, filed Dec. 28, 1962, and now abandoned.

This invention relates to new and useful compounds which impart to organic materials superior resistance to degradation and deterioration when they are exposed to actinic radiation, and in particular to ultraviolet radiation. This invention further relates to processes for the preparation of new and useful compounds of the type hereinbefore described. The compounds with which this invention is concerned are characterized as aryl hetero cyanoacrylates.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultraviolet range. Such uses include incorporation in plastic sheet materials and the stabilization in general of transparent plastic bodies. By far the greatest concern with respect to ultraviolet radiations is with those radiations which come from the sun. Most of these radiations have wave lengths between 250 and 400 millimicrons. The effects of such radiation on the human skin, producing sunburn and suntan are, of course, well known. Other effects, however, of great commercial importance relate to the photochemical degradation caused by ultraviolet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultraviolet light. It is well known that colored objects such as dyed textiles will fade on exposure to sunlight, and in particular, to ultraviolet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining aryl hetero cyanoacrylates with organic materials, there results compatible combinations with a vast number of film-forming plastics, resins gums, waxes and the like, which combinations further exhibit outstanding ultraviolet absorbing properties within the generally encountered ultraviolet region of 250 to 400 millimicrons. The compounds with which this invention is concerned, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film, or a dyed textile. Many of the compounds of this invention also absorb some visible light on the violet end of the spectrum which renders them particularly useful in many formulations which are susceptible to visible light degradation. Thus, polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not disadvantageous, or a detriment where alkaline sensitivity is no problem.

It is therefore an object of the present invention to provide new and useful compounds characterized by outstanding ultraviolet absorbing properties.

It is still another object of this invention to provide new and useful aryl hetero cyanoacrylates which are outstanding ultraviolet absorbing compounds.

It is still a further object of the present invention to provide processes for the preparation of new and useful ultraviolet absorbing compounds which are characterized as aryl hetero cyanoacrylates.

Other objects will appear hereinafter as the description proceeds.

The aryl hetero cyanoacrylates which are contemplated in this invention exhibit a prominent peak or peaks between 250 A. 400 A. and are devoid of nitro groups and nuclear bonded amino groups and have the following general formula:

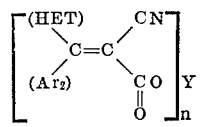

wherein HET represents, independently, a 5- or 6-membered heterocyclic nucleus or a benzo (5- or 6-membered) heterocyclic nucleus containing at least one pair of conjugated double bonds wherein the hetero atoms are oxygen, nitrogen and/or sulfur and Ar₂ represents an aromatic carbocyclic nucleus, $n$ is an integer from 1 to 2 and Y is a radical selected from the group consisting of alkenyl ($C_3$ to $C_{25}$), aryl, hetero and substituted derivatives thereof, e.g., halophenyl, halonaphthyl, alkoxyphenyl, alkoxynaphthyl, alkylphenyl, halothienyl, alkylthienyl, alkylfuryl, phenylfuryl, alkoxyfuryl, alkoxypyrridyl, halopyrryl, etc., when $n=1$, and when $n=2$, Y is a bivalent bridging radical such as alkylene, arylene, hetero (i.e., HET) and substituted derivatives thereof.

Examples of suitable heterocycles are: thiophene, furane, pyrrole, α-pyran, α-pyrone, pyridine, 1,2-dihydropyridine, oxazole, thiazole, isoxazole, isothiazole, pyrazole, 3-isopyrazole, imidazole, 2-isoimidazole, 1,2,3-triazole, 1,2,4-triazole, tetrazole, 1,3,4-oxadiazole, 1,2,5-oxadiazole, 1,2,3-thiadiazole, 1,2,3-oxathiazole, pyridazine, pyrimidine, pyrazine, 1,3,5-triazine and fused ring systems of benzene nuclei and naphthalene nuclei with the aforementioned heterocyclics, e.g., benzothiophene, benzofurane, quinoline, phthalazine, benzimidazole, 1,2,3-benztriazole, benzoxazole.

The hetero nuclei may contain alkyl substituted alkyl, halogen, acyl, sulfonyl, carboxamido, oxy and similar inert substituents which may vary the ultraviolet absorption spectrum but which do not affect the function and stability of the compounds. Such substituents include: alkyl, methyl, ethyl, n-propyl, iso-propyl, n-butyl, iso-butyl, tertiary-butyl, secondary-butyl, n-amyl, iso-amyl, tertiary-amyl and the other isomeric amyls, n-hexyl, iso-hexyl and the other isomeric hexyls, n-heptyls, iso-heptyl and the other isomeric heptyls, n-primary nonyl (nonyl-1), nonyl-(2), nonyl-(3), nonyl-(5), 2-methyl-octyl-2, 4-ethyl-heptyl-4, 2-methyl-4-ethyl-hexyl-4, n-primary octyl, octyl (2) (capryl), 2-methyl-3-ethyl-pentyl-3, 2,2,4-trimethyl-pentyl-4, 2-ethyl-hexyl-1, 3-ethyl-hexyl-3, 2-methyl-heptyl-2, 3-methyl-heptyl-3, 4-methyl-heptyl-4, n-primary decyl (decyl-1), decyl-4 (secondary decyl), 2-ethyl-octyl-3, (tertiary decyl), 4-propyl-heptyl-4 (tertiary decyl), undecyl-1 (n-primary decyl), undecyl-2 (n-secondary decyl), dodecyl-1 (n-dodecyl), tridecyl-1 (n-tridecyl), tridecyl-7, 3-ethyl-undecyl, tetradecyl-1 (n-tetradecyl), pentadecyl-1, (n-pentadecyl), pentadecyl-8, hexadecyl (cotyl), heptadecyl-9, octadecyl-1, 2-methyl heptadecyl-2, eicosyl-1, docosyl-1, tricosyl-12, tetracosyl, tricapryl, pentacosyl, hexacosyl, heptacosyl, octacosyl, nonacosyl, myrisyl (30 carbons).

Alkenyl: allyl ($CH_2=CHCH_2-$), methallyl $$(CH_2=C(CH_3)CH_2-)$$

crotyl ($CH_3CH=CHCH_2-$), butanyl-1

$$(CH_2=CH-CH-CH_3)$$

pentenyl-1, γ-isopropyl allyl, β-ethyl-propyl allyl, 2-methyl-octenyl-6, decenyl-1, decenyl-2, undecenyl, dodecenyl-2, octadecenyl, docosenyl, pentamethyl eicosenyl.

Substituted alkyl: cyanoethyl, cyano-n-propyl, cyano-isopropyl, cyano-n-butyl, cyano-n-isobutyl, cyano-n-amyl, cyanohexyl, cyanoheptyl, cyano-n-octyl, cyano-nonyl, cyanodecyl, cyanolauryl, cyanostearyl and the like, hydroxyethyl, hydroxy-n-propyl, hydroxy-isopropyl, hydroxyl-n-butyl, hydroxy-isobutyl, hydroxy-n-amyl, hydroxy-isoamyl, cyano-isoamyl, hydroxy-heptyl, hydroxyhexyl, hydroxy-nonyl, hydroxy-decyl, hydroxyl-lauryl, hydroxystearyl and the like, carbomethoxyethyl, carbomethoxypropyl, carbomethoxybutyl, carbomethoxyhexyl, carboethoxyethyl, carboethoxypropyl, carboethoxybutyl, etc., carbopropoxyethyl, carbopropoxypropyl, carboproproxybutyl, etc., carbobutoxyethyl, carbobutoxybutyl, etc., chloroethyl, chloropropyl (N-propyl, isopropyl), chlorobutyl (N-butyl, isobutyl, etc.), chloroamyl, chlorohexyl, chlorodecyl, chlorolauryl, and the like, bromoethyl, bromopropyl (N-propyl, isopropyl), bromobutyl (N-butyl, isobutyl, etc.), bromoamyl, bromohexyl, bromodecyl, bromolauryl, and the like, methoxyethyl, methoxypropyl (N-propyl, isopropyl), methoxybutyl (N-butyl, isobutyl, etc.), methoxyamyl, methoxyhexyl, methoxydecyl, methoxylauryl, and the like, ethoxyethyl, ethoxypropyl (N-propyl, isopropyl), ethoxybutyl (N-butyl, isobutyl, etc.), ethoxyamyl, ethoxyhexyl, ethoxydecyl, ethoxylauryl, and the like, hydroxyethoxyethyl, hydroxyethoxypropyl, hydroxyethoxybutyl, hydroxyethoxyamyl, hydroxypropoxyethyl, hydroxypropoxypropyl, hydroxypropoxybutyl, hydroxypropoxyamyl, hydroxybutoxyethyl, hydroxybutoxypropyl, hydroxybutoxybutyl, hydroxybutoxyamyl.

Halogen: fluorine, chlorine, bromine, iodine.

Acyl: acetyl, propionyl, butanoyl, amoyl, etc., benzoyl, toluoyl, naphthoyl, etc.

Sulfonyl: $CH_3SO_2$, benzene sulfonyl, toluene sulfonyl, etc.

Oxy: hydroxy, methoxy, ethoxy, hydroxyethoxy, etc.

Carboxamide ($-CONH_2$): N-methyl carboxamide ($CONHCH_3$), N-ethyl carboxamide, N-dimethyl carboxamide, N-diethyl carboxamide, etc.

Suitable aryls for Ar₂ include—

Aryl: phenyl, tolyl, xylyl, cumyl, α-naphthyl, β-naphthyl, α-anthraquinoyl, β-anthraquinonyl, γ-anthraquinonyl, phenanthranyl, diphenyl and the alkyl substituted derivatives thereof.

Substituted aryls, e.g.: anisole, phenetole, p-diethoxyphenyl, 1-methoxy phenanthryl, α-naphthylmethylether, β-naphthylmethylether, α-naphthylethylether, β-naphthylethylether, hydroxyethyl phenyl, hydroxypropyl phenyl, chlorophenyl, bromophenyl, 1,2-dichlorophenyl, 1,3-dichlorophenyl, 1,3,5-trichlorophenyl, 1,2-dibromophenyl, α-chlorotolyl, m-chlorotolyl, m-bromotolyl, bromo-o-xylyl, α,β-dichloro naphthyl, 4-bromoacenaphthyl, carboxyphenyl, carboxytolyls, carboxyxylyls, carbalkoxylphenyls, e.g., carbomethoxylphenyl, carboethoxylphenyl, carbalkoxytolyls, e.g., carbomethoxytolyls, acetophenyl, propiophenyl, butyrophenyl, lauroylphenyl, stearoylphenyl, p-acetotolyl, o-acetotolyl, α-benzoyl naphthyl, β-benzoyl naphthyl, acetaminophenyl, acet-methylamino phenyl, o-acetoaminotolyl, p-acetoaminotolyl, α-acetoaminonaphthyl, β-acetoaminonaphthyl, propio-aminophenyl, butyro-aminophenyl, α-propio-aminotolyl, p-propio-aminotolyl, o-butyroaminotolyl, p-butyroaminotolyl, o-lauroylaminotolyl, p-lauroylaminotolyl, o-stearolylaminotolyl, sulfamyl phenyl, sulfamyl naphthyl.

The aryl moiety may, thusly, be substituted similarly as the hetero moiety and the groups suitable for substitution in the hetero nucleus may be employed in the aryl carbocyclic nucleus, too.

Suitable Y substituents are those enumerated above as alkenyl, hetero and aryl substituents. As bivalent bridging (i.e., when $n=2$) groups, mention may be made of:

$$-CH_2CH_2-$$
$$-CH_2CH_2CH_2-$$
$$-CH_2CH_2CH_2CH_2-$$
$$-CH_2CH_2CH_2CH_2CH_2-$$

(1) 

(2) 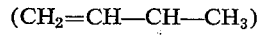

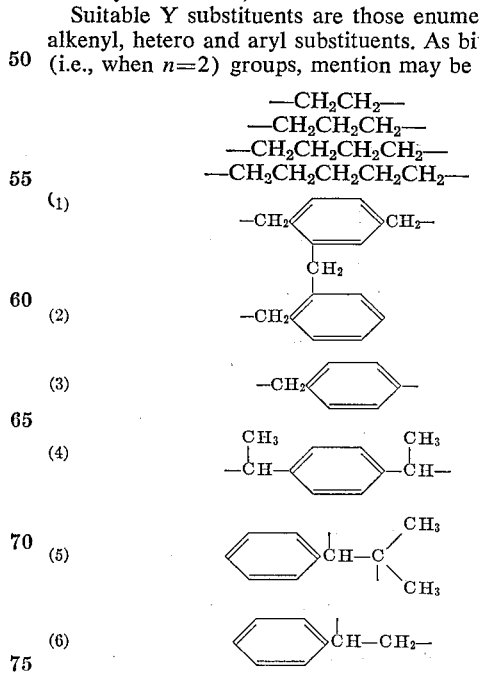

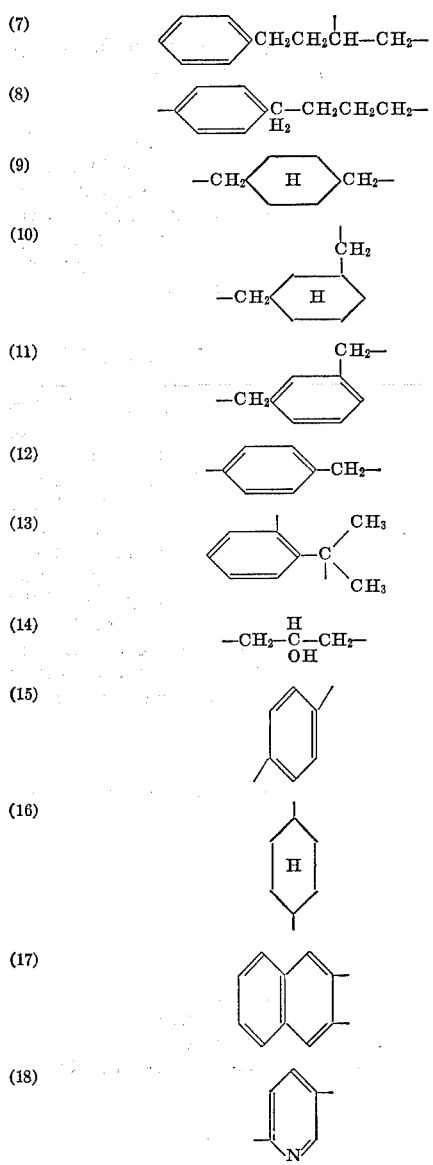

It is of course clear that other non-chromophoric substituents may be present in the above radicals, e.g., —CHClCHCl—
—CHBrCH₂CHBr—

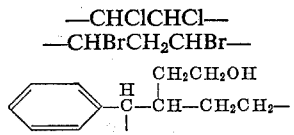

The general procedure for preparing the compounds of this invention involves condensation of aryl hetero ketone with a selected cyanomethylene ester, preferably in the presence of an acidic catalyst.

Suitable ketones include:

2-benzofuryl phenyl ketone
2-acetamido-4-phenyl-5-thiazolyl phenyl ketone
2-benzothiazolyl phenyl ketone
5-bromo-2-thienyl phenyl ketone
6-(benzyloxy)-3-methyl-2-benzofuryl phenyl ketone
5-bromo-2-benzofuryl p-bromophenyl ketone
5,7-dibromo-2-benzofuryl phenyl ketone
4,5-dibromo-2-thienyl phenyl ketone
4,5-diiodo-2-pyrryl phenyl ketone
4,5-diiodo-2-thienyl phenyl ketone
3,4-dimethoxyphenyl 2-furyl ketone
1,2-dimethyl-3-phenyl-3-pyrrolidyl phenyl ketone
3,5-dimethyl-4-isoxazolyl pentamethyl phenyl ketone
2,6-dimethyl-3-pyridyl phenyl ketone
4,5-dimethyl-3-pyrryl phenyl ketone
2,5-dimethyl-3-thienyl phenyl ketone
2,5-dimethyl-3-thienyl p-tolyl ketone
2,5-dimethyl-3-thienyl p-ethylphenyl ketone
2,3-dimethyl-1-naphthyl 2-thienyl ketone
2,5-diphenyl-3-furyl phenyl ketone
4,5-diphenyl-3-isoxazolyl phenyl ketone
1,5-diphenyl-3-pyrryl phenyl ketone
2-furyl o-tolyl ketone
2-furyl p-tolyl ketone
5-iodo-2-thienyl phenyl ketone
5-methyl-3-isoxazolyl phenyl ketone
2-methyl-3-indolyl phenyl ketone
2-methyl-3-indolyl p-tolyl ketone
2-methyl-1-naphthyl 2-thienyl ketone
2-methyl-5-benzoxazolyl phenyl ketone
5-methyl-2-thiazolyl phenyl ketone
5-methyl-3-phenyl-4-isoxazolyl phenyl ketone
5-methyl-1-phenyl-1,2,3-triazol-4-yl phenyl ketone
2-methyl-3-pyridyl phenyl ketone
1-naphthyl 2-pyridyl ketone
1-naphthyl 4-pyridyl ketone
1-naphthyl 3-pyridyl ketone
2-naphthyl 3-pyridyl ketone
phenyl 5-phenyl-3-furyl ketone
phenyl 5-phenyl-3-isoxazolyl ketone
phenyl 5-phenyl-2-pyrryl ketone
phenyl 5-phenyl-2-thienyl ketone
phenyl 4-thiazolyl ketone
phenyl 5-thiazolyl ketone
phenyl 2-thienyl ketone
phenyl 3-pyrazolyl ketone
phenyl 2-pyridyl ketone
phenyl 4-pyridyl ketone
phenyl 1,2,5-triphenyl-3-pyrryl ketone
phenyl 1-phenyl-4-pyrazolyl ketone
phenyl 6-phenyl-3-pyridyl ketone
phenyl 2-furyl ketone
p-methoxyphenyl 2-thienyl ketone
2-furyl m-methoxyphenyl ketone
p-hydroxyphenyl 5-methyl-2-thienyl ketone
2,5-dichloro-3-thienyl phenyl ketone
2,6-dimethyl-4-pyridyl phenyl ketone
3-allyl-4-hydroxyphenyl 5-ethyl-2-thienyl ketone
3,5-dichloro-2-hydroxyphenyl 2-furyl ketone
3,5-dichloro-4-methoxy-2-pyridyl phenyl ketone
3,5-dichloro-2-pyridyl phenyl ketone
3,5-dimethyl-4-isoxazolyl phenyl ketone
2,4-dimethyl-5-oxazolyl phenyl ketone
p-ethylphenyl 5-ethyl-2-thienyl ketone
4-tertiarybutyl-3-chloro-2-hydroxyphenyl 2-furyl ketone
5-ethyl-2-thienyl p-methoxyphenyl ketone
6-allyloxy-2,4-xylyl 2-furyl ketone
3'-chloro-4'-methoxy-4-biphenyl-yl 2-thienyl ketone
o-chlorophenyl 5-chloro-2-thienyl ketone In addition to the above contemplated derivatives, polyoxyalkylated derivatives thereof are within the purview of this invention. Any of the aforementioned compounds containing at least one reactive hydrogen atom may be reacted with an alkylene oxide or a compound functioning as an oxide (or mixtures thereof) such as:

Ethylene oxide, propylene oxide, butylene oxide, butylene dioxide, isobutylene oxide, glycidol, epichlorohydrin, butadiene dioxide, isobutylene oxide, styrene oxide, and the like, to yield the corresponding polyoxyalkylated products.

Among the types of compounds which are reactive in this manner are: hydroxy compounds, amide compounds, carboxy compounds, etc.

From one to about 200 mols of oxyalkylating agent may be condensed with the said reactive compounds.

The following examples will serve to illustrate the present invention without being deemed limitative thereof. Parts are by weight unless otherwise indicated.

Example 1.—Preparation of allyl-α-cyano-β-phenyl-β-(2-thienyl)acrylate

Into a 1-liter flask equipped with a stirrer, thermometer, dropping funnel, Vigreux column to the top of which is attached a Dean and Stark water separator and a reflux condenser, add

| | | |
|---|---|---|
| Phenyl-2-thienyl ketone | mol | 1.0 |
| Allyl α-cyanoacetate | mol | 1.2 |
| Ammonium acetate | g | 2 |
| Glacial acetic acid | cc | 56 |
| Benzene | cc | 550 |

The charge is heated to reflux and benzene is distilled out of the water separator until the reaction temperature is 96° C. While stirring the reaction mixture at 96° C., 10 cc. of a solution of 20 g. ammonium acetate compound dissolved in glacial acetic acid to a volume of 100 cc. is added every hour (10 additions). Further additions of ammonium acetate are made as follows—

| Grams added: | Hours at reflux (96° C.) |
|---|---|
| 2 | 17 |
| 2 | 23 |
| 4 | 25 |
| 4 | 43 |

The reaction mixture is stirred for a total of 48 hours at 96° C. during which time 36 cc. water is collected in the water separator. The benzene is evaporated from the mixture, and the residue washed three times with 500 cc. water. The oily layer is separated and fractionated in vacuo. The yield of product is 149.0 g.

Example 2.—Preparation of α-cyano-β-phenyl-β-(2-thienyl) acrylic acid propenyl ester Example 1 is repeated, using the propenyl ester in lieu of the allyl ester.

Example 3

Example 1 is repeated, employing the following ketones:

(a) 3,4-dimethoxyphenyl 2-furyl ketone
(b) 2,6-dimethyl-3-pyridyl phenyl ketone
(c) 4,5-dimethyl-3-pyrryl phenyl ketone
(d) 2,5-dimethyl-3-thienyl phenyl ketone
(e) 2-furyl o-tolyl ketone
(f) 2-methyl-1-naphthyl 2-thienyl ketone
(g) 1-naphthyl 2-pyridyl ketone
(h) phenyl 3-pyrazolyl ketone
(i) p-hydroxyphenyl 5-methyl-2-thienyl ketone Example 4

The product is Example 1 is used in a nitrocellulose lacquer, as follows.

A mixture of 20 parts of Solution I and 80 parts of Solution II is prepared wherein Solution I consists of:

| | Parts |
|---|---|
| ½ sec. nitrocellulose | 46 |
| Product of Example 1 | 4 |
| Cellolyn 502 (non-drying plasticizing alkyd resin of Hercules Powder Co.) | 35 |
| Dibutyl phthalate | 15 | and Solution II consists of:

| | Parts |
|---|---|
| Butyl acetate | 35 |
| Butanol | 15 |
| Toluene | 50 |

The resulting lacquer solution is drawn out on a metal plate with a Bird film applicator to give a 3 mil film. A similar film is prepared without the product of Example 1. Upon exposure to ultraviolet light, the latter film yellows and deteriorates before any visible signs of yellowing are observed in the protected film.

Example 5

Example 2 is repeated, employing as the ketone, p-(2-ethyl-hexyloxy)-phenyl 2-thienyl ketone.

Example 6

The product of Example 5 is incorporated into polyethylene by melting at 125° C. a mixture of 99.7 g. of polyethylene wax p.t. 95504 (Semet-Solvay) and 0.3 g. of absorber. The material is then pressed out in a Carver press to give a film of about 0.03 in. thick. The polyethylene film is well stabilized to ultraviolet light, and admirably protects food packaged therein.

Example 7

The product of Example 3(c) is incorporated into a synthetic latex as follows:

A 50% dispersion of the absorber of Example 3(c) is made by kneading 20 g. of the compound with 20 g. of formaldehyde-naphthalene - 2 - sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrile-butadiene latex (Chemigum 247) employing 5% of the absorber based on the weight of the latex. The latex is then sprayed onto leather. The film prepared in this manner shows less tendency to yellow on exposure to light than a similar film prepared in the same manner but omitting the ultraviolet absorber.

Example 8

Example 1 is repeated employing the following α-cyanoacrylic acid esters:

(a) isopropenyl α-cyanoacetate
(b) phenyl α-cyanoacetate
(c) totyl α-cyanoacetate
(d) o-chlorotolyl α-cyanoacetate
(e) p-chlorotolyl α-cyanoacetate
(f) m-xylyl α-cyanoacetate
(g) p-carboxyphenyl α-cyanoacetate
(h) p-carbomethoxyphenyl α-cyanoacetate
(i) p-carboethoxyphenyl α-cyanoacetate
(j) p-carbo-(2-ethylhexyloxy) phenyl α-cyanoacetate
(k) crotyl α-cyanoacetate
(l) decenyl-1-α-cyanoacetate
(m) p-stearoylphenyl α-cyanoacetate
(n) α-pyridyl α-cyanoacetate
(o) α-pyrimidinyl α-cyanoacetate
(p) p-quinolyl α-cyanoacetate
(q) p-hydroxyphenyl α-cyanoacetate
(r) p-sulfamyl phenyl α-cyanoacetate
(s) 4-chlorophenyl α-cyanoacetate
(t) 4-ethoxyphenyl α-cyanoacetate
(u) α-naphthyl α-cyanoacetate
(v) 2-methyl-α-naphthyl α-cyanoacetate
(w) 4-pyrazolyl α-cyanoacetate
(x) 4-methyl-2-thiazolyl α-cyanoacetate
(y) p-acetamidophenyl α-cyanoacetate
(z) p-benzamidophenyl α-cyanoacetate
(aa) p-benzoylphenyl α-cyanoacetate
(bb) p-carboiso-octoxyphenyl α-cyanoacetate In the preparation of many esters of the present invention and in particular the aryl esters, e.g., phenyl substituted phenyl, naphthyl, and the like, which require the corresponding cyanoacetate ester, there may be a tendency for the latter to undergo hydrolysis in the above-described type of condensation reaction. In order, therefore, in these cases to achieve an optimum yield, it may be desirable to prepare the ethyl ester or other lower alkyl ester and transform this ester into the aryl ester by transesterification with an excess of the corresponding phenol. A solvent may or may not be employed, depending on the physical state of the mixture of the alkyl ester and phenol. Usually, since these are solids, it is preferred to use an organic solvent such as benzene, toluene, or xylene. By virtue of the transesterification technique, the alkanol is produced which is stripped off, and the solvent may then also be removed in any suitable manner, as, for example, by distillation. In the transesterification reaction, it is also preferred to use a small amount (0.1% to about 2% by weight based on the weight of reactants) of a strong base, e.g., caustic soda, alkali carbonate, toluenesulfonamide sodium salt, and the like.

Examples 9(a)–9(i)

Examples 3(a)–3(i) are repeated (Examples 9a–9i) employing phenyl α-cyanoacetate.

Examples 10(a)–10(i)

Examples 3(a)–3(i) are repeated (Examples 10a–10i) employing decenyl-1 α-cyanoacetate.

Examples 11(a)–11(i)

Examples 3(a)–3(i) are repeated (Examples 11a–11i) employing p-carboethoxyphenyl α-cyanoacetate.

Examples 12(a)–12(i)

Examples 3(a)–3(i) are repeated (Examples 12a–12i) employing 4-pyrazolyl α-cyanoacetate.

Examples 13(a)–13(i)

Examples 3(a)–3(i) are repeated (Examples 12a–12i) 13i) using p-sulfamylphenyl α-cyanoacetate.

Examples 14(a)–14(i)

Examples 3(a)–3(i) are repeated (Examples 14a–14i) using p-hydroxyphenyl α-cyanoacetate.

Examples 15(a)–15(i)

Examples 3(a)–3(i) are repeated (Examples 15a–15i) using o-carboxamidophenyl α-cyanoacetate.

Examples 16(a)–16(i)

Examples 15(a)–15(i) are repeated using the N-mono-methyl substituted amide.

Example 17

The products of Examples 8(q) and 8(r) are oxyalkylated in an autoclave at 80° C. in the presence of 1.3% KOH as follows:

| Product of example | | Mols alkylene oxide |
|---|---|---|
| (a) | 8(q) | 6 ethylene oxide. |
| (b) | 8(q) | 12 ethylene oxide. |
| (c) | 8(q) | 30 ethylene oxide. |
| (d) | 8(q) | 10 propylene oxide, then 10 ethylene oxide. |
| (e) | 8(r) | 8 ethylene oxide. |
| (f) | 8(r) | 15 ethylene oxide. |
| (g) | 8(r) | 50 ethylene oxide. |
| (h) | 8(r) | 8 butylene oxide, then 20 ethylene oxide. |

The compounds derived from the 8(q) compound have the following general formula:

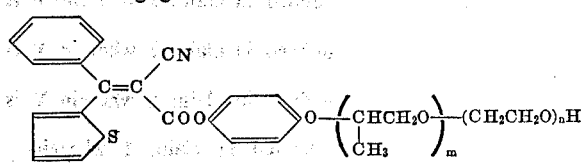

wherein $m$=mols of propylene oxide
$n$=mols of ethylene oxide

The compounds derived from the 8(r) compound have the following general formula:

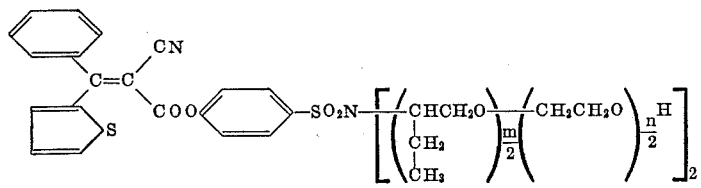

wherein $m$=mols butylene oxide
$n$=mols ethylene oxide

Example 18

The product of Example 3(d) is prepared as a 3% solution in methyl Cellosolve and a sponge of polyvinyl chloride foam is impregnated therewith. The foam is prepared from the following formulation:

| | Parts |
|---|---|
| Marvinol VR–10 (polyvinyl chloride resin—U.S. Rubber) | 100 |
| Di-2-ethylhexylphthalate | 130 |
| Barium cadmium stabilizer (Advance BS–105) | 3.5 |
| Celogen (p,p'-oxybis-benzenesulfonyl hydrazide) | 35 |
| | 258.5 |

The sponge is squeezed free of solvent and dried. It is much more stable to ultraviolet light than untreated material.

Example 19

The product of Example 17(b) is used in formulating a liquid detergent as follows:

| | |
|---|---|
| Nonylphenol+10 ethylene oxide condensate | 8 |
| Tetrapotassium pyrophosphate | 26 |
| Sodium silicate | 4 |
| Low viscosity carboxymethyl cellulose | 0.4 |
| KOH | 2 |
| Water | 57.6 |
| Product of 5(c) | 2 |

Excellent stability to ultraviolet light after 100 hours exposure is obtained.

Example 20

The product of Example 17(c) is used to impregnate dyed cotton. The bath contains 3 g./100 ml. water. Excellent protection against ultraviolet light degradation is obtained.

Example 21

Example 1 is repeated, employing 0.5 m. of the following cyanoacetates in lieu of 0.25 mol of the allyl compound of Example 1:

(a) glyceryl-1,3-bis(α-cyanoacetate)
(b) propylene-3-bis(α-cyanoacetate) (bis-cyanoacetyl-1, 3-propanediol)
(c) butylene-1,4-bis(α - cyanoacetate) (bis - cyanoacetyl-1,4-butanediol)
(d) bis-cyanoacetyl-4,4'-dihydroxybenzene
(e) bis-cyanoacetyl-o-cyclohexylenediol
(f) bis-cyanoacetyl-p-xylylene glycol
(g) bis-cyanoacetyl-2,5-dimethylhydroquinone
(h) 1,2-dichloroethylene glycol bis(α-cyanoacetate)

[NCCH$_2$—COOCHClCHClOOCCCH$_2$CN]

(i) 1,3-dibromo-propyleneglycol bis(α-cyanoacetate)

[NCCH$_2$COOCHBrCH$_2$CHBrOOCCH$_2$CN]

(j) bis-cyanoacetyl-3,5-dihydroxypyridine

Example 22

A 10 gm. swatch of "Dacron" (ethylene glycol terephthalic acid polyester) cloth is heated in an aqueous bath of 0.4 gm. of the compound of Example 1 dispersed in 300 mls. of water at 190° F. for one hour. The dispersion is prepared by adding to the 190° F. water, while stirring vigorously, a solution of the acrylamide in 5 ml. of ethanol. The dried swatch is compared with an untreated sample after both are exposed to ultraviolet light in a fadeometer. After 100 hours, the untreated swatch shows a distinct yellow coloration, whereas the treated sample is unchanged.

Example 23

Example 22 is repeated, using the following compounds:

(a) Example 2
(b) Example 3–a
(c) Example 3–b
(d) Example 3–c
(e) Example 3–d
(f) Example 3–g
(g) Example 3–h
(h) Example 5

The results are comparable to Example 22.

Example 24

Examples 22 and 23 are repeated, using acrylic textile materials as follows:

(a) Films of homopolyacrylonitrile
(b) Films of copolymer (90% acrylonitrile, 10% vinyl pyridine)
(c) Films of polymer mixture (95% polyacrylonitrile, 5% polyvinylpyrrolidone)

Excellent stabilization is achieved in each instance.

Example 25

To 100 gms. of powdered nylon 66 (polyhexamethylene adipamide) are added 1 g. of the absorber of Example 1. After thorough mixing, the mixture is extruded into fibers from a hot melt. A cloth is woven from said fibers and compared with a similar fabric without absorber, in the manner of Example 11. The fabric containing the absorber exhibits superior ultraviolet light stability.

Example 26

Example 25 is repeated, using the following polymers:

(a) "Dacron"
(b) Polyethylene
(c) Polypropylene
(d) Cellulose acetate (2.5 acetyl value)
(e) Polyvinylidene chloride Example 27

Examples 25 and 26 are repeated, using the absorbers of Examples 21–a through 21–g.

The compounds of this invention are soluble in many diverse types of polymers, resins, waxes and the like, and therefore, they are particularly suitable and adaptable for the stabilization of such materials as exemplified above. The non-oxyalkylated products are insoluble in water. Those compounds which contain lesser amounts of oxyalkyl groups, that is, up to about 4–6 groups per molecule, are, in general, less soluble in the non-polar solvents but are readily dispersible in water. The compounds containing larger amounts of alkylene oxide, that is, above about 6 mols thereof per mole of base compound, range from soluble in water with the solubility increasing as the number of oxyalkylene groups increases.

The ultraviolet absorbing compounds of the present invention may be used to stabilize all organic materials which are susceptible to ultraviolet degradation and are particularly useful in the stabilization of resins and plastics, whether they be in the form of films, or molded products and either clear opaque, semi-opaque or translucent. Foam, plastics and fibers are also admirably stabilized by these compounds. Pigments, polishes, creams, lotions, paints, enamels, varnish films, and dyestuffs, when susceptible to ultraviolet degradation, have been found to be excellently stabilized by the compounds of the present invention. The amount of stabilizer to be incorporated in such compositions is not critical except that sufficient should be present to effect an acceptable degree of stabilization and no more should be used than is necessary to obtain such results. In general, between about 0.1% and 10% by weight based upon the organic solids weight to be stabilized may be used.

Other variations in and modifications of the described processes which will be obvious to those skilled in the art can be made in this invention without departing from the scope, or spirit thereof.

We claim:

1. An essentially colorless compound exhibiting a prominent absorption peak in the range of 2500 A. to 4000 A. of the formula

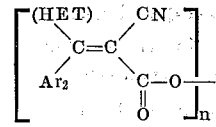

wherein
(a) (HET) represents a monocyclic heterocyclic nucleus containing at least one pair of conjugated double bonds selected from the group consisting of 5- and 6-membered heterocycles containing as the hetero atom at least one member selected from the group consisting of oxygen, nitrogen and sulfur, and the corresponding benzo monocyclic heterocyclics, said nucleus being devoid of nitro and nuclear bonded amino groups,
(b) $Ar_2$ is an aromatic carbocyclic nucleus,
(c) $n$ is an integer from 1 to 2, and
(d) when $n=1$, Y is a radical selected from the group consisting of $C_3$–$C_{25}$ alkenyl, phenyl, naphthyl, and HET radicals and the lower alkyl, lower alkoxy, halo, carboxy, carboxamide, lower carbalkoxy, lower alkanoyl, benzoyl, alkanoylamino of up to $C_{18}$ and sulfamyl derivatives of said phenyl and naphthyl and (HET) radicals, and
(e) when $n=2$, Y is a bivalent radical selected from the group consisting of lower alkylene, arylene of up to 10 carbon atoms, cyclohexylene 2-hydroxy propylene, chloro and bromo substituted lower alkylene and 2,5-pyridylene.

2. A compound as defined in claim 1 wherein (HET) is a monocyclic sulfur-containing heterocyclic.

3. A compound as defined in claim 1 wherein (HET) is a monocyclic nitrogen-containing heterocyclic.

4. A compound as defined in claim 1 wherein (HET) is a monocyclic oxygen-containing heterocyclic.

5. A compound as defined in claim 1 wherein (HET) is thienyl and $Ar_2$ is phenyl.

6. A compound as defined in claim 1 wherein (HET) is furyl and $Ar_2$ is phenyl.

7. A compound as defined in claim 1 wherein $n=1$.

8. A compound as defined in claim 1 wherein $n=2$.

9. A compound as defined in claim 7 wherein Y is alkenyl.

10. A compound as defined in claim 7 wherein Y is phenyl.

11. A compound as defined in claim 7 wherein Y is (HET).

12. A compound as defined in claim 8 wherein Y is lower alkylene.

13. A compound as defined in claim 1 wherein (a) (HET) is 2-thienyl
(b) Ar$_2$ is phenyl
(c) $n$ is 1
(d) Y is allyl.

14. A compound as defined in claim 1 wherein
(a) (HET) is 2-thienyl
(b) Ar$_2$ is p(2-ethylhexyloxy) phenyl
(c) $n$ is 1
(d) Y is propenyl.

15. A compound as defined in claim 1 wherein
(a) (HET) is 2-thienyl
(b) Ar$_2$ is phenyl
(c) $n=2$
(d) Y=2-hydroxy propylene.

16. A compound as defined in claim 1 wherein
(a) (HET) is 2-thienyl
(b) Ar$_2$ is phenyl
(c) $n=2$
(d) Y=tetramethylene.

References Cited

UNITED STATES PATENTS

| | | | |
|---|---|---|---|
| 2,978,462 | 4/1961 | Berman et al. | 260—345.2 |
| 3,022,318 | 2/1962 | Berman et al. | 260—345.2 |
| 3,072,481 | 1/1963 | Berman et al. | 96—48 |
| 3,085,469 | 4/1963 | Carlson | 88—24 |

HENRY R. JILES, *Primary Examiner.*

C. M. SHURKO, *Assistant Examiner.*